United States Patent
Huang

Patent Number: 5,671,036
Date of Patent: Sep. 23, 1997

[54] EYEGLASS TEMPLE HAVING A SPRING

[76] Inventor: Chun-Chu Huang, P.O. Box 90, Tainan 704, Taiwan

[21] Appl. No.: 763,981

[22] Filed: Dec. 10, 1996

[51] Int. Cl.⁶ .............................. G02C 5/16; G02C 5/22
[52] U.S. Cl. ........................................ 351/113; 351/153
[58] Field of Search ..................... 351/113, 111, 351/114, 116, 140, 141, 153, 41, 158; 16/228

[56] References Cited

U.S. PATENT DOCUMENTS

| | | | |
|---|---|---|---|
| 4,818,093 | 4/1989 | Tabacchi | 351/113 |
| 5,473,395 | 12/1995 | Huang | 351/113 |

*Primary Examiner*—Hung X. Dang
*Attorney, Agent, or Firm*—Bacon & Thomas

[57] ABSTRACT

An eyeglasses temple includes an end connector, a position sleeve, a spring, a screw, a housing and a metal temple combined together. The end connector to be combined with a lens frame has a rear square portion fitting in a front cavity of the sleeve. The screw has a front threaded portion screwing with a threaded hole of the sleeve, with the spring located between the head of the screw and a rear end surface of the sleeve. Then the sleeve with the spring and the screw fits in a front cavity of the housing, which is combined with a front end portion of the metal temple by means of screws. Then the metal temple has elasticity to be pushed outward to conform with the face of a wearer.

1 Claim, 6 Drawing Sheets

5,671,036

EYEGLASS TEMPLE HAVING A SPRING

BACKGROUND OF THE INVENTION

This invention concerns an eyeglasses temple, particularly having elasticity for pushed outward so as to conform the face of a wearer.

A known conventional eyeglasses temple shown in FIGS. 1 and 2 includes an end connector 10 to combine with a lens frame, a sleeve 11, a spring 13, a screw 12 and a temple 14 combined together.

The end connector 10 is fitted in the sleeve 11, and the screw 12 is inserted through the spring 13 and the sleeve to screw with a threaded hole 100 of the end connector 10, with a rear end of the spring urging a head 120 of the screw 12 and with a front end urging a rear end surface of the sleeve 11. After the end connector 10, the sleeve 11, the spring 13 and the screw 12 are assembled together, they are all inserted and adhered in a front end of the temple 14 with a kind of glue poured through a hole 141 of the temple 14, with the front end of the end connector exposing out. Then the end connector 10 is combined with the pivotal end A1 of a lens frame A. So the temple has some elasticity to be pushed outward.

However, the temple 14 is made of plastics formed by a plastic injecting process, hard to be applied to a metal temple.

SUMMARY OF THE INVENTION

This invention has been devised to offer a kind of eyeglasses temple either made of plastic or metal.

A feature of the invention is a housing having a projection and a threaded hole in a side, and the projection has a female threaded hole for screws to combine a metal temple with the housing. Then an end connector, a sleeve, a spring and a screw being the same as used in the conventional eyeglasses temple are placed in the housing to let the front end of the end connector to expose out to combine with the lens frame.

BRIEF DESCRIPTION OF DRAWINGS

This invention will be better understood by referring to the accompanying drawings, wherein.

DESCRIPTION OF THE PREFERRED EMBODIMENT

Figure 1:
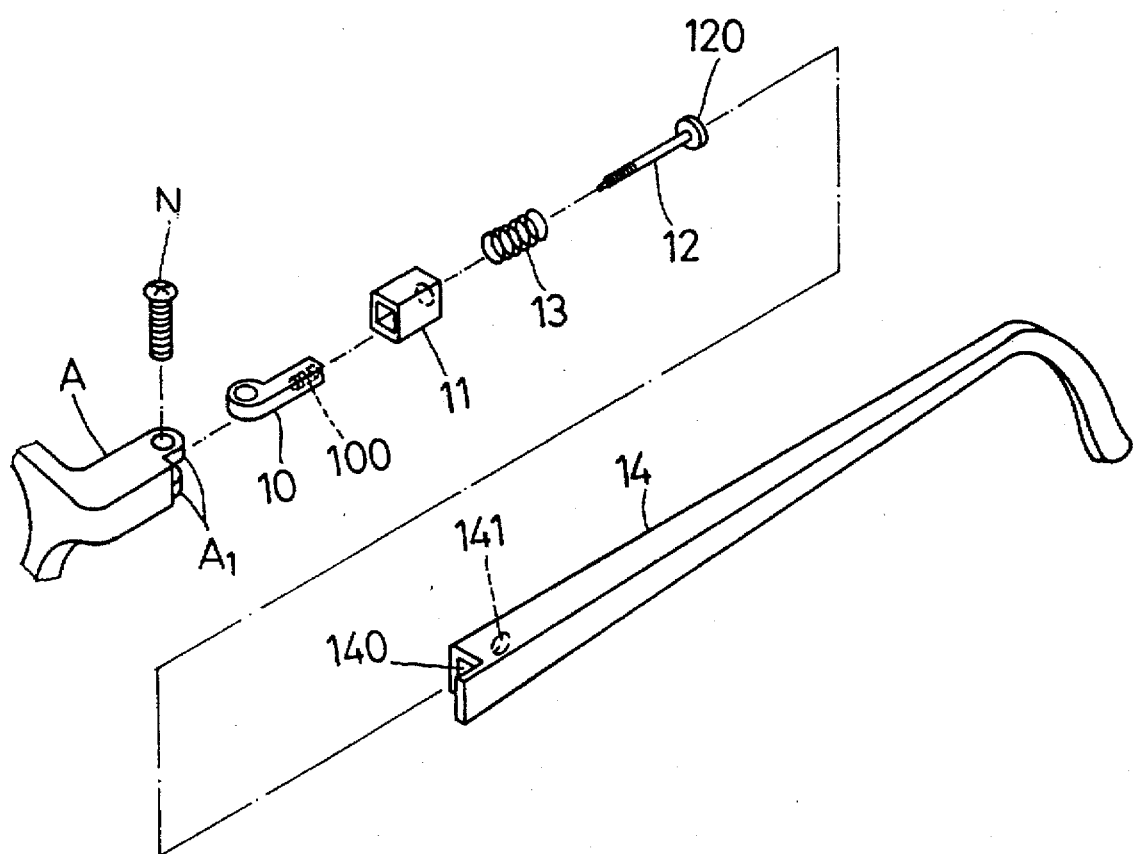
FIG. 1 is an exploded perspective view of a conventional elastic eyeglasses temple.
Figure 2:
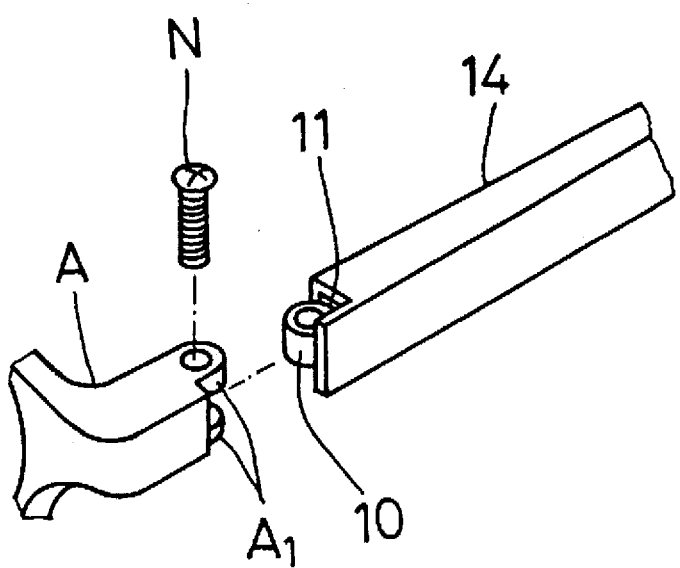
FIG. 2 is a partial exploded perspective view of another conventional elastic eyeglasses temple.
Figure 3:
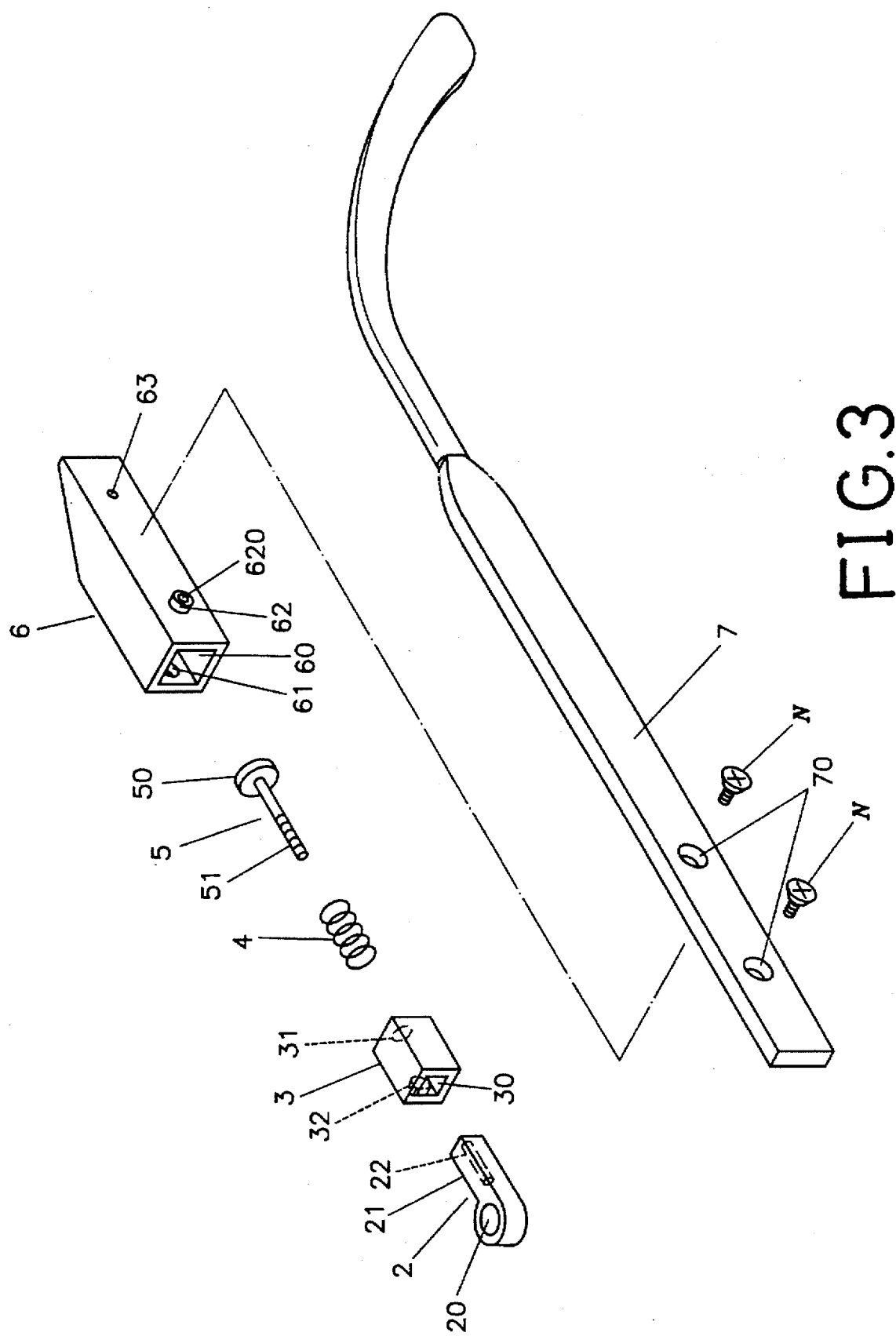
FIG. 3 is an exploded perspective view of a eyeglass temple in the present invention.
Figure 4:
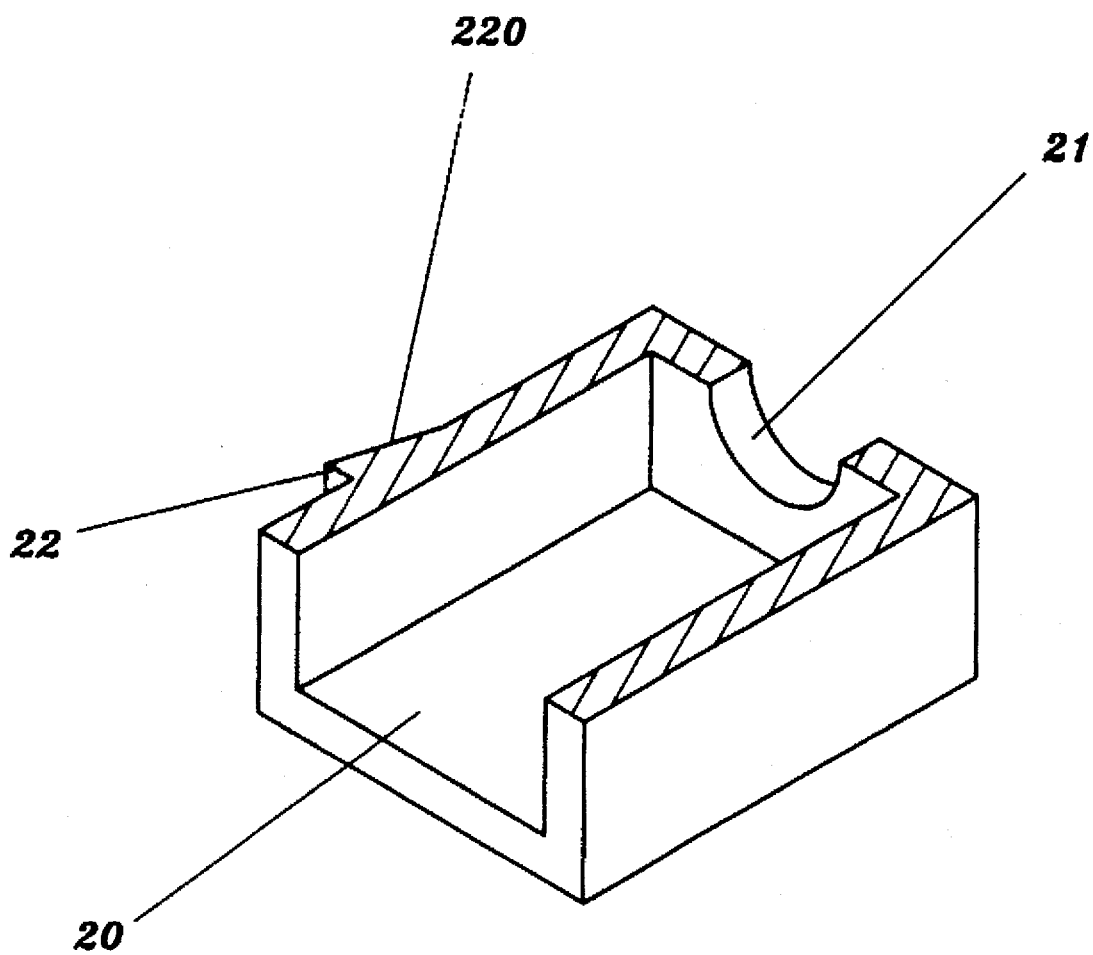
FIG. 4 is a perspective view of the eyeglasses temple in the present invention.

A preferred embodiment of an eyeglasses temple in the present invention, as shown in FIGS. 3 and 4, includes an end connector 2, a position sleeve 3, a coil spring 4, a screw 5, a housing 6, and a metal temple 7 combined together.

The end connector 2 has a sidewise position hole 20 in a front end, a square rear portion 21, and a threaded hole 22 bored longitudinally in the square portion 21.

The position sleeve 3 fits around the square portion 21, made integral by plastic injecting process, having a square cavity 30 in a front portion, a round hole 31 in a rear portion communicating with the square cavity 30, a projection 32 extending out from a side and having a sloped edge 320 in a side.

The coil spring 4 has its front end elastically urging a rear end surface of the position sleeve 3 around the round hole 31 and its rear end urging a head 50 of a screw 5.

The screw 5 has a large head 50 formed in a rear end and a body with a threaded front portion 51 in front of the head 50. The body inserts in the spring 4 and the position sleeve 3 and has its threaded portion 51 engaging with the threaded hole 22 of the end connector 2.

The housing 6 has a longitudinal cavity 60 in a front portion, a fit hole 61 in a corresponding side to the side with the projection 32 of the position sleeve 3, a projection 62 extending out from the opposite side of the fit hole 61 and having a female threaded hole 620, and a threaded hole 63 in a rear portion of the opposite side.

The metal temple 7 has two holes spaced apart in a a front portion to respectively correspond to the projection 62 and the threaded hole 63 of the housing 6 for screws N to combine the temple 7 with the housing 6.

Figure 5:
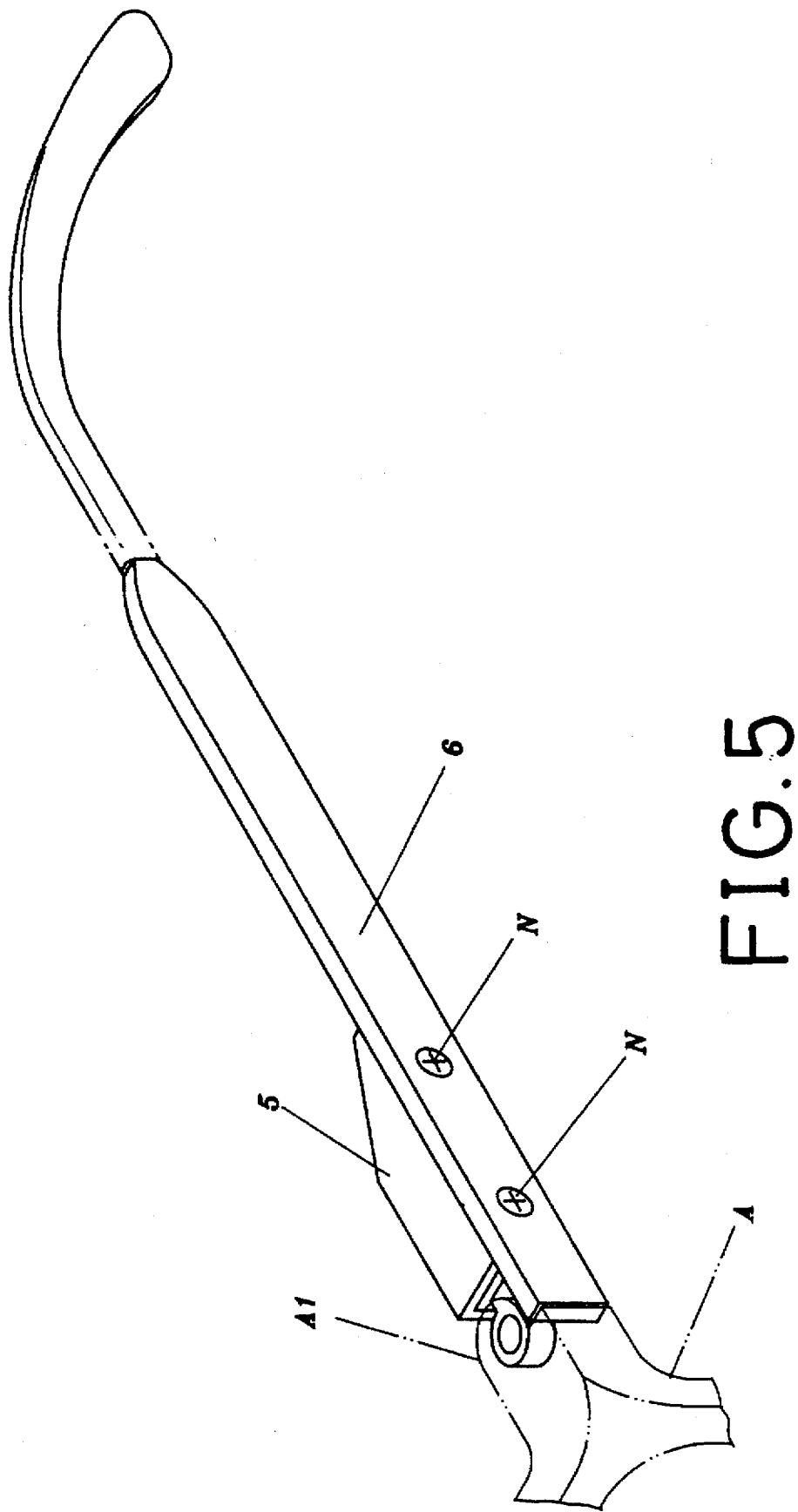
FIG. 5 is a cross-sectional view of a position sleeve of the eyeglasses temple in the present invention.
Figure 6:
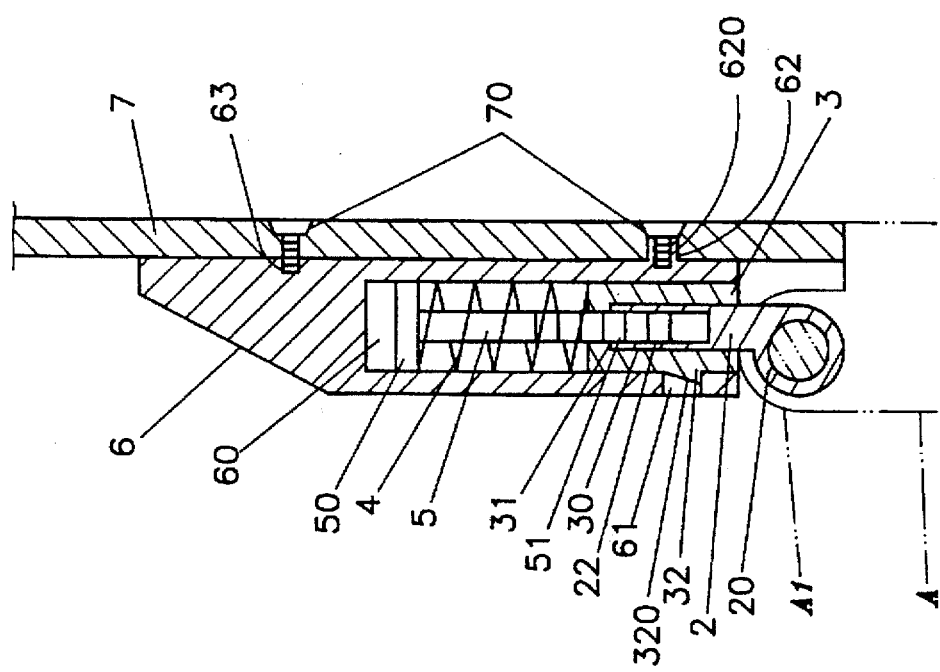
FIG. 6 is a cross-sectional view of the eyeglasses temple in the present invention; and, FIG. 7 is a cross-sectional view of the eyeglasses temple in the present invention, showing it being used.

In assembling, referring to FIGS. 5 and 6, the square portion 21 of the end connector 2 is inserted in the square cavity 30, and then the body of the screw 5 is pushed through the coil spring 4 and the round hole 31 of the position sleeve 3, with the threaded front portion 51 screwed with the threaded hole 22, and with the coil spring 4 having its rear end urging the head 50 of the screw 5. Then the four components 2, 3, 4, 5 in the assembled condition are inserted in the cavity 60 of the housing 6, with the projection 32 of the position sleeve 3 having its sloped edge 320 forcing the position sleeve 3 move into the cavity 60 so that the square sleeve 3 secured firmly in the cavity 60 of the housing 6. After that, the metal temple 7 is combined with the housing 6, with the holes 70 facing the projection 62 and the threaded hole 63, and then forcing the projection 62 fit in one of the holes 70 and screwing screws N in the threaded hole 63 and the other hole 70. So the metal temple will have elasticity got from the housing 6 with the components 2, 3, 4, and 5. Now the end connector 2 is combined with a lens frame A, with the position hole 20 facing and being screwed with a screw N with the threaded hole of a pivotal base A1 of a lens frame A.

Figure 7:
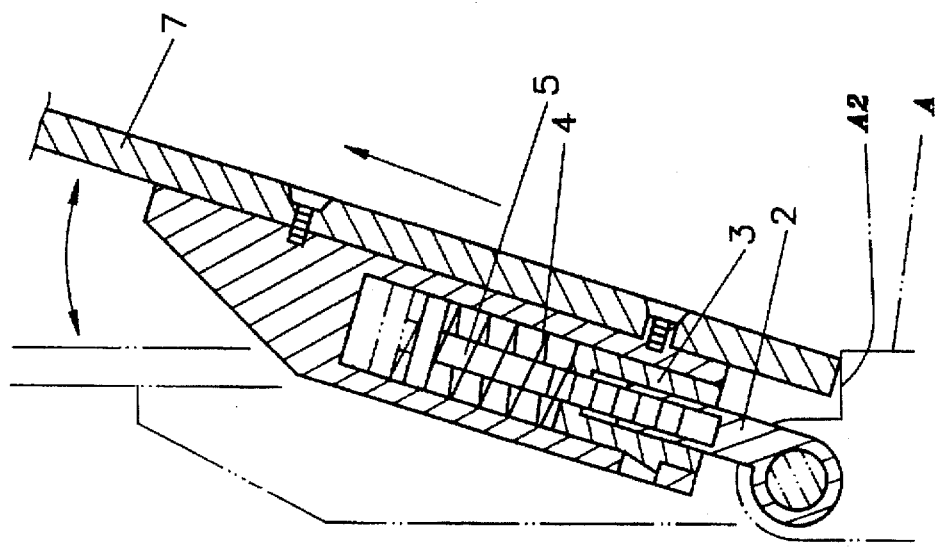

In wearing this eyeglasses temples, referring to FIG. 7, if a user has his/her face broader than the distance between the two metal temples 7, he/she pushes outward the temples 7 so that the end connector 2 may pull the screw 5 to compress the spring 4 with a fulcrum formed by the front edge of the temple 7 and the stop edge A2 of the lens frame A. Then the temples 7 are elastically spread outward to conform the face of the user.

While the preferred embodiment of the invention has been described above, it will be recognized and understood that various modifications may be made therein and the appended claims are intended to cover all such modifications which may fall within the spirit and scope of the invention.

What is claimed is:

1. A eyeglasses temple comprising:
   an end connector having a position hole in a front end, a square rear portion, and threaded hole bored longitudinally in said square portion;
   a position sleeve having a longitudinal square cavity in a front portion for said square portion of said end connector to fit therein, a longitudinal round hole communicating with said square cavity in a rear portion, a projection extending out from a side and having a sloped surface in a side;

a screw having a head and a body with a front threaded portion;

a coil spring fitting around said body of said screw;

a housing having a cavity in a front portion for said position sleeve to fit therein, and a fit hole in a side corresponding to the side of said projection of said position sleeve; and characterized by said housing having a projection extending out from an opposite side of said side of said fit hole of said housing, said projection having a female threaded hole, a threaded hole in the same side of said projection, a metal temple having two holes spaced apart to correspond to said projection and said threaded hole of said housing for screws to combine said metal temple with said housing with screws engaging with said projections and said threaded holes of said housing and said two holes of said temple.

* * * * *